(12) United States Patent
Rice

(10) Patent No.: US 7,216,438 B2
(45) Date of Patent: May 15, 2007

(54) ONE PIECE CENTERING RULER

(76) Inventor: James MacDougal Rice, 8650 Smith La., Manassas, VA (US) 20112

( * ) Notice: Subject to any disclaimer, the term of this patent is extended or adjusted under 35 U.S.C. 154(b) by 0 days.

(21) Appl. No.: 11/050,006

(22) Filed: Feb. 3, 2005

(65) Prior Publication Data

US 2006/0168836 A1    Aug. 3, 2006

(51) Int. Cl.
     *B43L 7/00*      (2006.01)
     *G01B 3/04*      (2006.01)
     *G01D 21/00*      (2006.01)

(52) U.S. Cl. .......................................... 33/520; 33/494

(58) Field of Classification Search .................. 33/520, 33/644, 429, 483, 492, 494, 562, 563, 566
See application file for complete search history.

(56) References Cited

U.S. PATENT DOCUMENTS

| | | | | |
|---|---|---|---|---|
| 79,175 A | * | 6/1868 | Winterbottom | 33/429 |
| 967,561 A | * | 8/1910 | Robbins | 33/429 |
| 1,309,930 A | * | 7/1919 | Akin | 33/42 |
| 1,409,723 A | * | 3/1922 | Jacob | 33/429 |
| 1,776,245 A | * | 9/1930 | Barrett | 33/494 |
| 2,183,063 A | * | 12/1939 | Dorsey | 33/494 |
| 2,382,250 A | * | 8/1945 | Newell | 33/429 |
| 3,010,209 A | * | 11/1961 | McKinley | 33/481 |
| 3,975,830 A | * | 8/1976 | Lopacki | 33/520 |
| 4,128,030 A | * | 12/1978 | Kundikoff | 33/429 |
| 4,455,760 A | * | 6/1984 | Arceneaux, Jr. | 33/482 |
| 4,742,619 A | * | 5/1988 | Swanson | 33/474 |
| 6,341,427 B1 | * | 1/2002 | Tepley | 33/194 |

* cited by examiner

*Primary Examiner*—Christopher W. Fulton
(74) *Attorney, Agent, or Firm*—Rossi, Kimms & McDowell, LLP

(57) ABSTRACT

A centering ruler includes a first straight edge, a second straight edge, an angle θ therebetween, and a measuring scale, marked on both sides of the ruler, which divides the first straight edge into equal increments. To find the center of a straight side of a workpiece, one aligns a first edge of a first side of a ruler with the straight side, positions a second edge of the ruler at the approximate center of the straight side, measures a minimum distance from a first end of the straight side to the second edge of the ruler, marks a first line of an "X" using the second edge as a guide, flips the ruler over to the second side, aligns the first edge of the ruler with the straight side, measures the afore-determined minimum distance from a second end of the straight side to the second edge of the ruler, and marks a second line of an "X" using the second edge as a guide. The center of the "X" marks the center of the workpiece.

6 Claims, 2 Drawing Sheets

ONE PIECE CENTERING RULER

FIELD OF THE INVENTION

This invention relates in general to a one piece centering ruler. The ruler is used to find the center of a workpiece having a straight side. The ruler includes two straight edges and a measuring scale.

BACKGROUND OF THE INVENTION

The prior art provides several mechanical devices which have many moving parts to find the center of a workpiece. Centering devices having multiple parts are described in the following United States patents: U.S. Pat. No. 6,243,963 B1; U.S. Pat. No. 6,158,137; U.S. Pat. No. 5,437,105; U.S. Pat. No. 1,309,930; U.S. Pat. No. 202,180 and others. These devices have many moving parts, and they are not suitable for dirty dusty wet environments. One piece devices and methods for finding the center of a workpiece are described in the following United States patents: U.S. Pat. No. 6,311,408 B1; U.S. Pat. No. 5,090,129; U.S. Pat. No. 2,764,818; U.S. Des. 399,769 and others. These devices are limited by their length to smaller workpieces.

Thus it is desirable to provide a simple one piece device for finding the center of any size workpiece. The present invention provides a one piece centering ruler, which may be used with a marking utensil, such as a pencil for finding the center of any size workpiece.

SUMMARY OF THE INVENTION

The present invention provides a centering ruler, and a method for finding the center of a workpiece having a straight side. The ruler includes two or more straight edges and a measuring scale.

In accordance with a preferred embodiment of the invention the centering ruler includes a first straight edge, a second straight edge, an angle $\theta$ between the first straight edge and the second straight edge; and a measuring scale which divides the length of the first straight edge into equal increments. The measuring scale is marked on both sides of the ruler.

A method for finding the center of a straight side of a workpiece includes: aligning a first straight edge of a first side of a ruler with the straight side, positioning a second straight edge of the ruler at the approximate center of the straight side, measuring a minimum distance from a first end of the straight side to the second straight edge of the ruler, marking a first line of an "X" using the second straight edge as a guide, flipping the ruler over to the second side, aligning the first straight edge of the ruler with the straight side, measuring the afore-determined minimum distance from a second end of the straight side to the second straight edge of the ruler, and marking a second line of an "X" using the second straight edge as a guide. The center of the "X" marks the center of the workpiece.

In accordance with another preferred embodiment of the invention the centering ruler includes a first straight edge, a second straight edge, a third straight edge, an angle $\theta$ between the first straight edge and the second straight edge, the same angle $\theta$ between the first straight edge and the third straight edge, and a measuring scale which divides the length of the first straight edge into equal increments.

In accordance with another preferred embodiment of the invention, a method for finding the center of a straight side of a workpiece includes: aligning a first straight edge of a ruler with the straight side, positioning a second straight edge of the ruler at the approximate center of the straight side, measuring a minimum distance from a first end of the straight side to the second straight edge of the ruler, marking a first line of an "X" using the second straight edge as a guide, measuring the afore-determined minimum distance from a second end of the straight side to a third straight edge of the ruler, and marking a second line of an "X" using the third straight edge as a guide. The center of the "X" marks the center of the workpiece.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Figure 1:
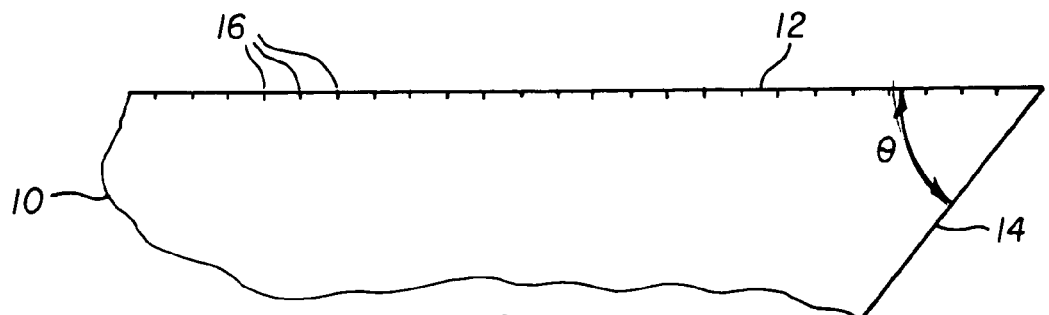
FIG. 1 is a front view of a centering ruler.

Referring to FIG. 1, the present invention is a ruler 10 having a first straight edge 12 and a second straight edge 14, having an angle $\theta$ between the first and second straight edges. In a preferred embodiment of the invention, the angle $\theta$ is about 45 degrees. In another preferred embodiment of the invention, the angle $\theta$ is between 45 and 22.5 degrees. In another preferred embodiment of the invention, the angle $\theta$ is about 135 degrees. In another preferred embodiment of the invention, the angle $\theta$ is between 135 degrees and 157.5 degrees.

Figure 2:
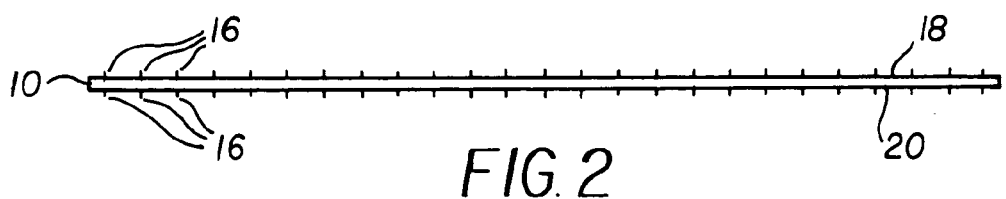
FIG. 2 is a side view of the centering ruler.

The entire length of the first straight edge 12 is marked with a measuring scale 16 which divides the entire length of the first straight edge 12 into equal increments. Referring to FIG. 2, the ruler has a first side 18 and a second side 20, and according to a preferred embodiment of the invention, the measuring scale 16 is marked on both sides of the ruler 10.

Figure 3:
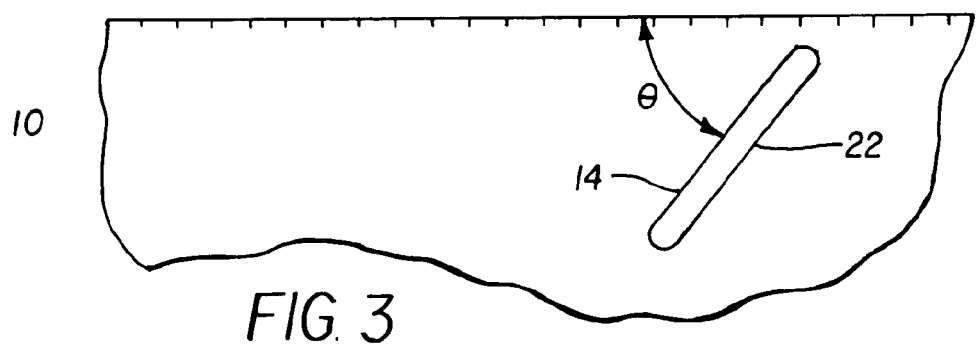
FIG. 3 is a front view of another embodiment of a centering ruler.

Referring to FIG. 3, in accordance with another preferred embodiment of the invention, the second straight edge 14 is located within a slot 22 in the interior of the ruler 10. The slot 22 is preferably oval in shape, however the slot 22 may be formed in other shapes such as square, triangular, or rectangular.

Figure 4:
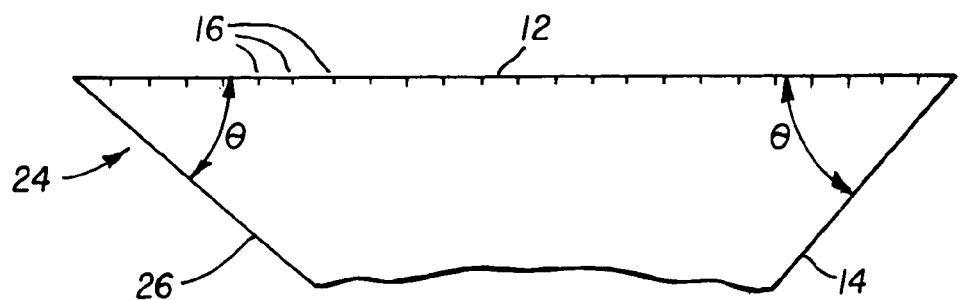
FIG. 4 is a front view of another embodiment of a centering ruler.

Referring to FIG. 4, in another preferred embodiment of the invention, the ruler 24 has a first straight edge 12 a second straight edge 14, and a third straight edge 26. The ruler 24 has an angle $\theta$ between the first 12 and second straight edges 14 and between the first 12 and third straight edges 26. The measuring scale 16 is marked on only one side of the ruler 24.

Figure 5:
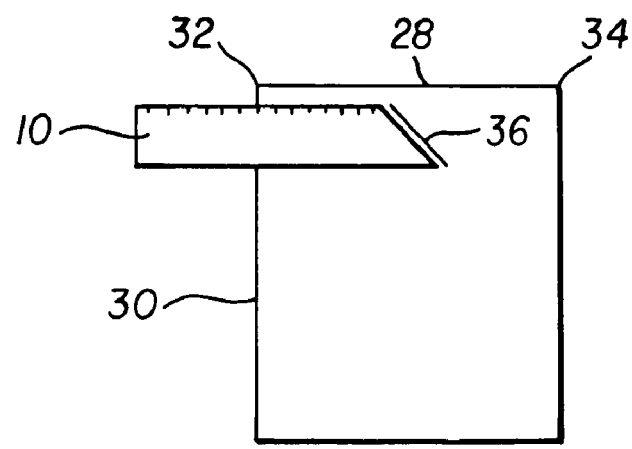
FIG. 5 is a front view of the first step of a method for finding the center of a workpiece.
Figure 6:
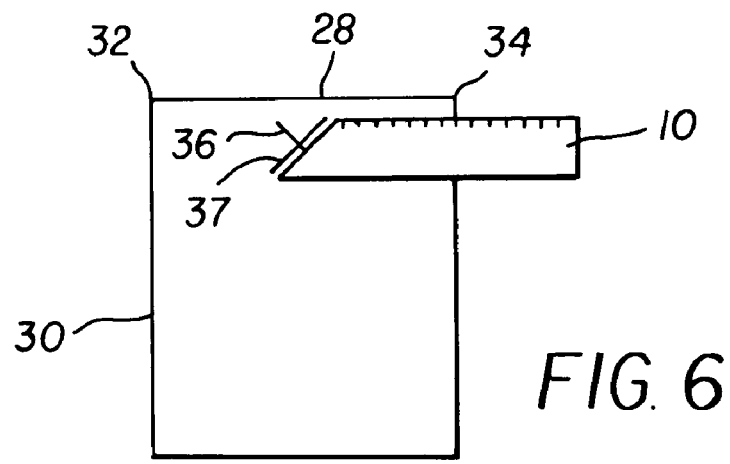
FIG. 6 is a front view of the second step of a method for finding the center of a workpiece.
Figure 7:
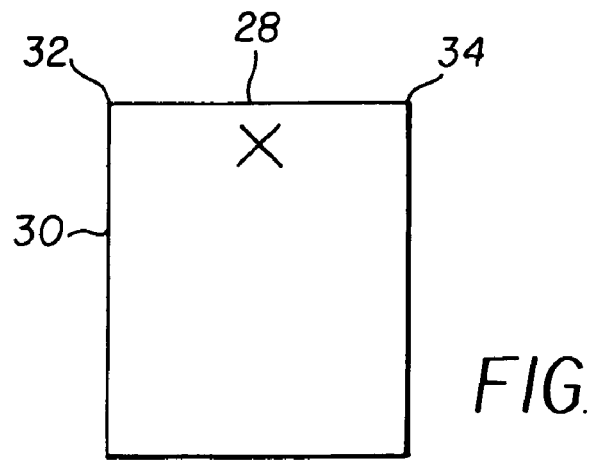
FIG. 7 is a front view of the center of a workpiece, marked with an "X" in accordance with the present invention.

FIGS. 5, 6, and 7 illustrate the operation of the centering ruler 10 for finding the center of a straight side 28 of a workpiece 30, said straight side having a first end 32 and a second end 34. Referring to FIG. 5, commencing at the first end 32 of the straight side 28, the user aligns the first straight edge 12 of the ruler with the straight side 28 of the workpiece, and locates the second straight edge 14 at the approximate center of the straight side 28. Employing the second straight edge 14 as a guide, the user draws a first line 36 with a marking tool, and uses the scale 16 to measure the minimum distance from the first end 32 to the first line 36. As shown on FIG. 6, the user repositions the ruler and measures the afore-determined distance along the straight side 28, commencing from the second end 34. Employing the second straight edge 14 as a guide, the user draws a second line 38 with a marking tool.

Referring to FIG. 7, according to the aforementioned steps, an "X" is drawn on the workpiece, wherein the center of the "X" is the center of the straight side 28 of the workpiece 30.

What is claimed is:

1. A method for finding the center of a straight side of a substantially rectangular workpiece comprising:

aligning a first straight edge of a first side of a ruler with the straight side of the substantially rectangular workpiece;

positioning a second straight edge of the ruler at an approximate center of the straight side;

measuring a minimum distance from a first end of the straight side to the second edge of the ruler;

marking a first line of an "X" using the second straight edge as a drawing guide;

flipping the ruler over to a second side of the ruler;

aligning the first straight edge of the ruler with the straight side;

measuring the afore-determined minimum distance from a second end of the straight side to the second straight edge of the ruler; and making a second line of an "X" using the second straight edge as the drawing guide, wherein the center of the "X" marks the center of the substantially rectangular workpiece, and the first straight edge and the second straight edge define an angle θ.

2. A method as claimed in claim 1 wherein θ is between 45 and 22.5 degrees.

3. A method as claimed in claim 1 wherein θ is between 135 and 157.5 degrees.

4. A method for finding the center of a straight side of a substantially rectangular workpiece comprising:

aligning a first straight edge of a ruler with the straight side of the substantially rectangular workpiece;

positioning a second straight edge of the ruler at the approximate center of the straight side;

measuring a minimum distance from a first end of the straight side to the second straight edge of a ruler;

marking a first line of an "X" using the second straight edge as a first drawing guide;

measuring the afore-determined minimum distance for a second end of the straight side to a third edge of the ruler; and marking a second line of an "X" using the third straight edge as a second drawing guide, wherein the center of the "X" marks the center of the substantially rectangular workpiece, the first straight edge and the second straight edge define an angle θ, and the first straight edge and the third straight edge define the same angle θ.

5. A method as claimed in claim 4 wherein θ is between 45 and 22.5 degrees.

6. A method as claimed in claim 4 wherein θ is between 135 degrees and 157.5 degrees.

* * * * *